United States Patent [19]
Khoury et al.

[11] Patent Number: 5,594,586
[45] Date of Patent: Jan. 14, 1997

[54] PHOTOREFRACTIVE LIMITING QUADRATIC PROCESSOR

[75] Inventors: Jehad Khoury, Arlington; Charles L. Woods, Stow; Mark Cronin-Golomb, Reading; Jack Fu, Brighton, all of Mass.

[73] Assignee: The United States of America as represented by the Secretary of the Air Force, Washington, D.C.

[21] Appl. No.: 236,936

[22] Filed: May 2, 1994

[51] Int. Cl.$^6$ ............................ G02B 27/46; G02B 5/23
[52] U.S. Cl. ........................ 359/559; 359/29; 359/338; 359/339; 359/349
[58] Field of Search ................. 359/10, 29, 559, 359/560, 561, 558, 337, 339, 349, 338

[56] References Cited

U.S. PATENT DOCUMENTS

| | | | |
|---|---|---|---|
| 3,608,994 | 9/1971 | McDonnell | 359/561 |
| 4,089,589 | 5/1978 | Brockman et al. | 359/560 |
| 4,991,177 | 2/1991 | Chang et al. | 372/21 |
| 5,006,813 | 4/1991 | Khoshnevisan et al. | 330/4.3 |
| 5,086,483 | 2/1992 | Capps | 359/560 |
| 5,337,170 | 8/1994 | Khoury et al. | 359/29 |
| 5,367,579 | 11/1994 | Javidi et al. | 359/561 |
| 5,383,056 | 1/1995 | Nishii et al. | 359/561 |

*Primary Examiner*—Timothy P. Callahan
*Assistant Examiner*—My-Trang Nu Ton
*Attorney, Agent, or Firm*—Robert L. Nathans; Stanton E. Collier

[57] ABSTRACT

Limiting quadratic processing and compansion in photorefractive two beam coupling is disclosed. Two-beam coupling in photorefractive barium titanate employs the imaged intensity of the signal to amplify the reference beam while maintaining the phase of the reference beam. The phase distorted signal beam is converted to that of the controlled phase of the reference beam. The high pump limit of amplification in this two-beam coupling device produces an amplitude compressed output to reduce multiplicative noise. Lost contrast of the image is thereafter restored. Beam clean-up of a non-intelligence bearing beam can be carried out by a similar process; a low pass filter consisting of a pinhole plate can be used in place of the second photorefractive crystal in the Fourier plane and only the planar wavefront portion will pass through the pinhole and may be collimated by a lens to provide a cleaned planar output beam.

10 Claims, 6 Drawing Sheets

PHOTOREFRACTIVE LIMITING QUADRATIC PROCESSOR

STATEMENT OF GOVERNMENT INTEREST

The invention described herein may be manufactured and used by or for the Government for governmental purposes without the payment of any royalty thereon.

BACKGROUND OF THE INVENTION

Rectification of AC signals into DC signals is one of the simplest and the most important processes in electronics. In electronics it is achieved in two stages: polarity elimination followed by low-pass filtering.

In optics, spatial rectification can be achieved through similar steps: phase elimination and spatial low pass filtering. It has considerable importance in optical signal processing for such applications as beam cleanup, injection of the output of multimode fibers into single mode fibers, and amplification of the output of a single diode laser by an array of phase-locked lasers.

In contrast to the use of diodes for polarity elimination in rectification for serial electronics, we use quadratic processing to demonstrate optical phase elimination. Quadratic or square law receivers are often used in detecting signals in the presence of signal-dependent or multiplicative noise and in processing non-Gaussian signals. For detecting Gaussian signals in non-Gaussian noise, the limiting square law receiver is the optimal receiver In accordance with the present invention we illustrate the mechanism of rectification using photorefractive two-beam coupling. We present a computer simulation of the optical rectification and its relationship to beam cleanup experiments. We also propose a new technique for dealing with multiplicative complex speckle noise on imaged amplitude objects. This method uses the limiting square law processing associated with two-beam coupling to convert complex multiplicative noise into additive noise. Experimental results are presented accompanied by computer simulations showing improvements of the signal to noise ratio (SNR) due to the associated dynamic range compression. This SNR can be further improved by subsequent nonlinear filtering in the Fourier plane. Finally, we present a general method for the reduction of multiplicative noise in optical images.

This method generalizes the homomorphic filtering technique by the principle of compansion (compression and expansion). Compansion is a well established technique in electronics for reducing noise is serial signals. We believe that this is the first time that the compansion principle has been introduced in optical signal processing.

BRIEF SUMMARY OF EMBODIMENTS OF THE INVENTION

Two-beam coupling in photorefractive barium titanate employs the imaged intensity of the signal to amplify the reference beam while maintaining the phase of the reference beam. The phase distorted signal beam is converted to that of the controlled phase of the reference beam. The high pump limit of amplification in this two-beam coupling device produces an amplitude compressed output which improves the intelligence bearing signal and reduces multiplicative noise. The remaining low intensity noise is reduced by variable thresholding in the Fourier plane. The contrast of the image signal is thereafter restored in the relatively noise free output image.

Beam clean-up of a non-intelligence bearing beam can be carried out by a similar process; a low pass filter consisting of a pinhole plate can be used in place of the second photorefractive crystal in the Fourier plane and only the planar wavefront portion will pass through the pinhole and may be collimated by a lens to provide a cleaned planar output beam.

BRIEF DESCRIPTION OF THE DRAWINGS

Other features and advantages of the invention will become apparent upon study of the following detailed description taken in conjunction with the drawings in which.

DETAILED DESCRIPTION OF PREFERRED EMBODIMENTS OF THE INVENTION

Figure 1:
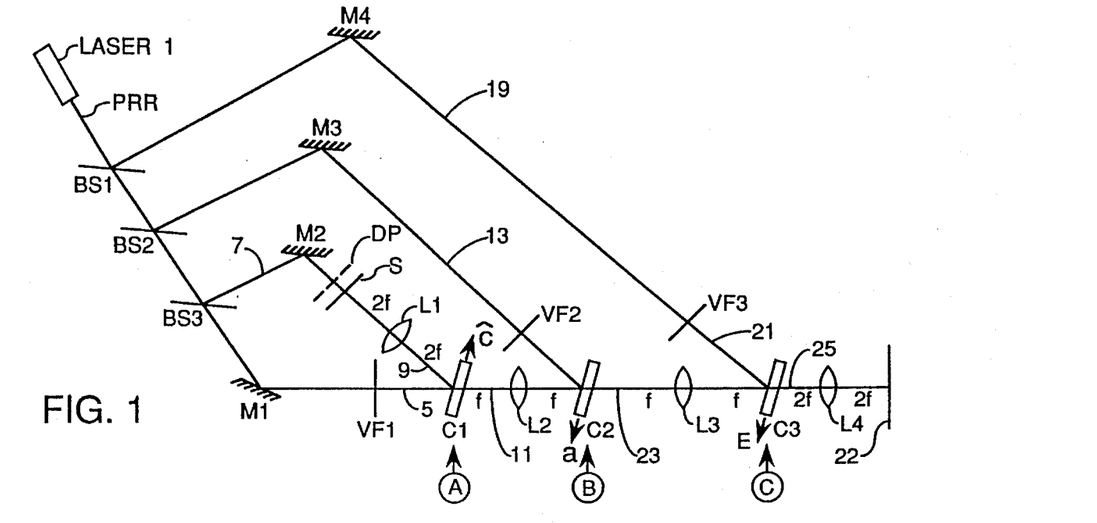
FIG. 1 shows a preferred embodiment of the multiplicative noise reduction apparatus of the invention.
Figure 2:
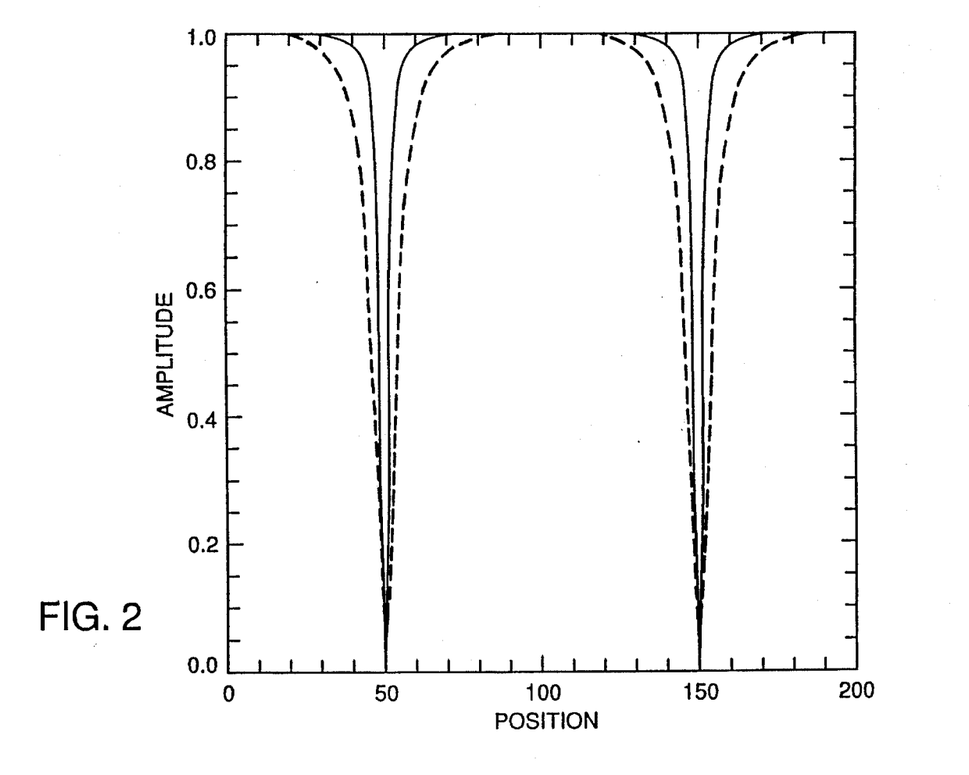
FIG. 2 illustrates rectification of a sinusoidal input. The dotted and solid curves correspond to values of m= ten to the third and ten to the fourth power respectively, while the intensity of the signal beam is normalized to unity.

In FIG. 1, laser 1 produces a first clean reference beam without a signal impressed thereon, and which is labled PRR since it is a phase reference beam. Beam splitter (BS) 3 illuminates the input object or optical signal s which is imaged by lens L1 into photorefractive, nonlinear crystal C1 which is preferably barium titanate. The designation "2f" indicates imaging rather than Fourier transforming which is indicated in other portions of the Fig. as "f". In our embodiment, we simulated an input image s having multiplicative noise by employing a weakly diffusing plate DP positioned in front of s. The designations M refer to mirrors and the BS designations refer to beam splitters used to create reference beams such as 13 and 19. The VF designations refer to variable density filters which control the reference beam intensities. The input image or optical signal s is imaged by lens L1 into crystal C1. The phase restoring reference beam 5 is also directed at the crystal along with the distorted signal 9. The phase restored beam 11 is Fourier transformed by lens L2 and the result is inserted into C2. The noise reducing reference beam 13 is also directed at C2. The output of C2, which is the noise reduced beam 23, is again Fourier transformed by lens L3 and the result is inserted into C3. Reference beam 19 passes through VF3 and the resulting contrast restoring reference beam 21 is directed at C3. The output of C3 is the contrast restored beam 25 which carries the original input image or signal s. The relatively noise free image which is the output of C3 is imaged by lens L4 upon output plane 22.

In section A, of FIG. 1 VF1 is selected to provide a phase pattern which is to be restored to the distorted signal s directed at the first crystal C1. We employ two-beam coupling in photorefractive barium titanate to use the imaged intensity of the signal to amplify the reference beam 5 while maintaining the phase of the reference beam. In this process the irregular phase of the distorted signal beam is converted to that of the controlled phase of the reference beam. In addition, the signal to noise ratio improvement is obtained in this step in addition to the phase restoration and noise phase elimination. In this implementation, the high pump limit of amplification in two-beam coupling automatically produces an amplitude compressed output which improves the signal s and reduces noise and does it particularly well for a binary amplitude input signal. Additional devices similar to section B could be added in this image plane if desired to remove additive noise in the input by thresholding.

In section B, VF2 is selected to provide an intensity pattern to reduce the noise in the output of section A. In this implementation, variable thresholding is employed in the Fourier plane as addressed by VF2 in two-beam coupling deamplification in the barium titanate crystal to produce a Wiener-like filter. It is only necessary to enhance the high intensity signals relative to the low as determined relative to the local reference produced by VF2, so that expansion implementations are possible particularly if also thresholded. In this section B, low intensity noise is reduced and high intensity signals are passed or enhanced.

In section C, VF3 is selected to restore the contrast to the image of the output signal and possibly to further reduce noise. In this implementation, the low pump limit of two-beam coupling amplification is used to produce expansion to compensate for the compression produced in section A. This produces an implementation of compansive noise reduction, and an optical compansion device is produced with benefits and applications similar to electronic compansion devices. In this case it enables the tailoring of the intensity in the Fourier transform plane of section B to have a better dynamic range for noise reduction. In some cases, it may be desirable to add a device similar to section B in the image plane of section C to further reduce noise.

More specifically in section A, VF1 is selected to provide a phase pattern which is to be restored to the distorted signal s. When signal with a known phase is multiplied by a complex noise pattern, the phase of the input is distorted (for strong high frequency noise becoming essentially the phase of the noise) and recovered by a phase measuring and compensating element, in this case the device in provided by section A. The basic physical technique is section A is to intensity modulate (phase preserving) the known phase which we provide in the reference beam by the intensity of the noisy signal. In our experiment, the signal was an intensity modulated plane wave, and section A could have been provided by an optically addressed spatial light modulator (SLM) with noisy signal addressing of a plane wave reflected signal, with accuracy subject to the limitations of the spatial resolution of the SLM. In our experiment, we used the extremely high resolution and dynamic range provided by photorefractive two-beam coupling in which a hologram is written which preserves the phase of the reference beam but provides a local intensity amplification to the reference beam by diffracting light at precisely the correct phase from the noisy signal image in the crystal. In this manner, the imaged intensity of the noisy signal is used to amplify the reference beam while maintaining the phase and intensity provided in the reference beam by VF1. This eliminates the phase of the noisy signal by substituting the phase of the reference beam with an intensity profile determined by the imaged noisy signal. It is also possible to provide signal to noise improvement in this step in addition to the phase restoration (noise phase elimination). In our experiment, the intensity of the reference beam should be 100 to 1000 times smaller than the signal level to be amplified, depending on the gain of the particular photorefractive crystal used. This provides the high pump intensity limit of amplification and compression in two-beam coupling. The compressed output improves the signal and reduces noise particularly well for binary amplitude input signals. In this case, the pump is the noisy signal and so the high pump intensity is produced by a weak intensity reference beam requiring a strongly attenuating filter VF1. Additional devices similar to section B could be added in this image plane if desired to remove additive noise in the input by thresholding employing any knowledge of the signal relative to noise in the image plane which would not provide a false image.

In section B, VF2 is selected to provide a spatial intensity pattern to address the noise reduction in the output of section A. In this implementation, the procedure is variable thresholding in the Fourier plane as addressed by the VF2 modulated reference beam in two-beam coupling deamplification in barium titanate to produce attenuation for the regions of a slowly varying noise profile which dominate the weaker portions of the signal's Fourier transform. See U.S. Pat. No. 5,337,180 issued to Charles Woods and Jihad Khoury assigned to the same assignee as the assignee of the present invention regarding this variable thresholding technique. In this case, VF1 was chosen to sharpen information containing edges, increasing the height of the signal peaks in the Fourier transform plane of section B to improve the noise reduction. In regions where the characteristic strong peaks of the signal Fourier transform rise above the noise background, the energy is transmitted. In two beam coupling, the threshold reference intensity is provided by the spatial variation in the VF2 modulated reference beam. Since it is only necessary to enhance the high intensity signals relative to the lower intensity, expansion implementations are possible. One design implementation would simultaneously threshold and expand. In this section, we utilize section A's conversion of any noise to scalar multiplicative noise together with the Fourier transform's production of an energy spectrum of sharp peaks for an intensity modulated signal and broad diffused energy for a noise signal. It is also likely that a DC block may improve the performance by removing the average illumination of the noisy signal.

In section C, VF3 is selected to provide a spatial addressing beam to restore the distorted contrast to the image in the output signal and to possibly further reduce noise. In our experimental implementation, the low pump limit of two-beam coupling amplification is used to produce expansion to compensate for the compression produced in section A which is basically unaffected by the thresholding experimentally used in section B. In this implementation, the intensity of the reference beam should be 2 to 10 times larger than the signal level to be amplified, depending on the gain of the particular photorefractive crystal used. This provides the low pump intensity limit of expansion in two-beam coupling. This produces an implementation of compansive noise reduction, and an optical compansion device is produced with benefits and applications similar to electronic compansion devices. In some cases, it may be desirable to add a device similar to section B in the image plane of section C to further reduce noise.

The filters VF1, VF2, and VF3 adjust the intensity and phase of the reference beams as described in previous paragraphs. In the two beam coupling implementation, the following descriptions apply: VF1 provides both the signal phase information and sets intensity level which specifies the compression for the gain in section A (it is important that this intensity be set so that information carrying edges are maintained); VF2 provides the spatial intensity threshold level for the noise reduction in the Fourier transform (spatial frequency spectrum) plane (in this implementation there is no expansion processing and no DC block); and VF3 provides the spatial intensity profile for contrast restoration in the signal image (our implementation requires expansion to correct the compression in section A and does not use a threshold to reduce background).

This device may be used for beam clean-up to optically correct phase errors and enhance the dynamic range of spatial light modulators. Specifically, an amplitude modulating SLM with poor phase properties and limited but reproducible dynamic range can be converted to have high quality uniform phase by the device of section A and the device in section A can be selected to be operating in a expanding or compressing limit. If there is no noise, the device in section B may be eliminated and the device in section C can provide additional contrast manipulation. By placing a phase modulating SLM in the output plane, an output is produced with a high quality amplitude (with increased dynamic range) and phase modulation operation.

This device may be used for beam clean-up to efficiently form phased array beams or a single beam from high power but coherent noisy beams. For example, a laser beam distribution system might consist of a single mode fiber carrying a weak single mode beam which is coherent with the high energy but noisy beam from a multi-mode fiber. The output of the single mode fiber replaces the input laser beam, and the output from the multi-mode fiber replaces the noisy signal input to section A (the reflected output from BS3 is blocked or BS3 is simply removed). The output from the device is a clean beam with the phase set by the spatial phase selected in VF1. In the case that a collimated or planar phase beam is desired, a pinhole spatial filter may replace the crystal in section B and in addition section C may be eliminated.

Figure 4:
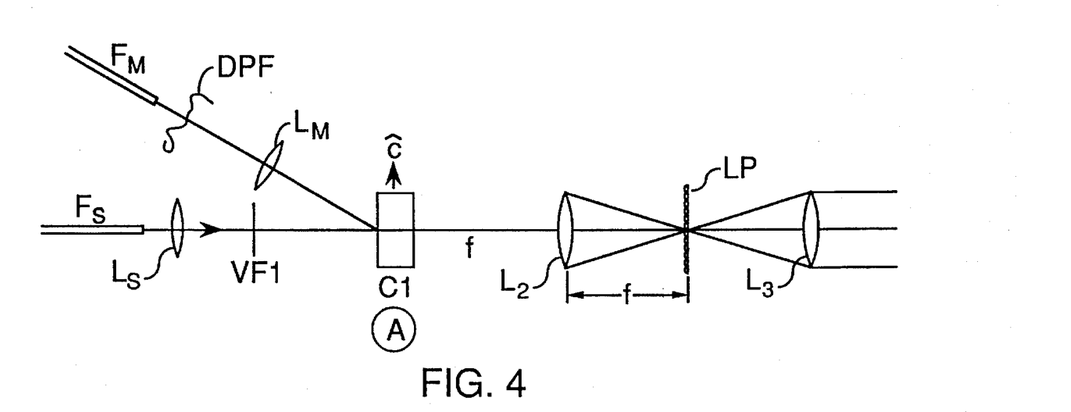
FIG. 4 illustrates an embodiment for beam clean-up utilizing a low pass filter in the form of a pinhole plate.
Figure 5:
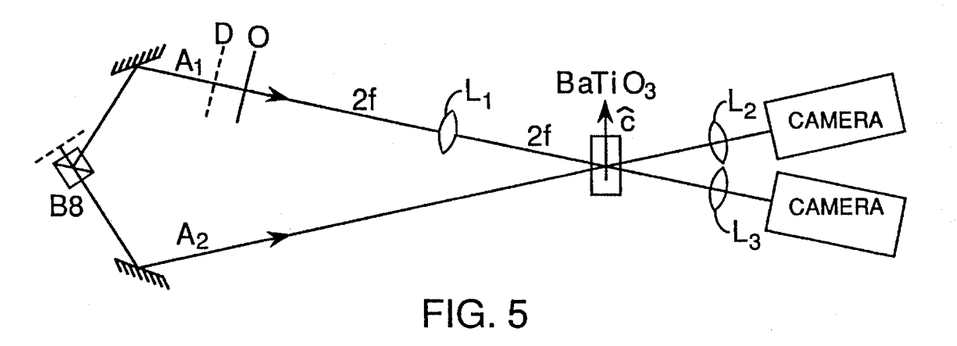
FIG. 5 illustrates an experimental arrangement used for noise conversion.
Figure 6A:
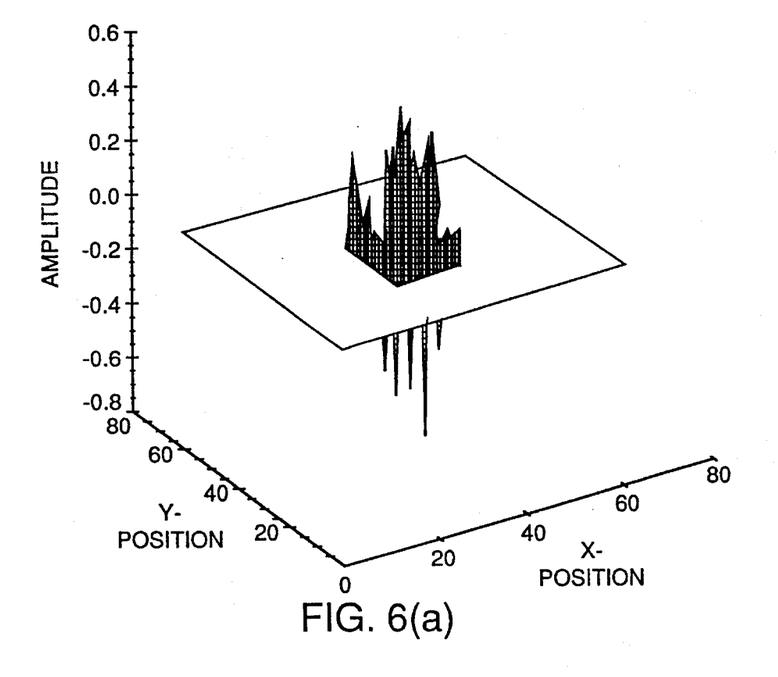
FIGS. 6a–6f illustrate various computer output plots useful in the further understanding of the present invention.
Figure 6B:
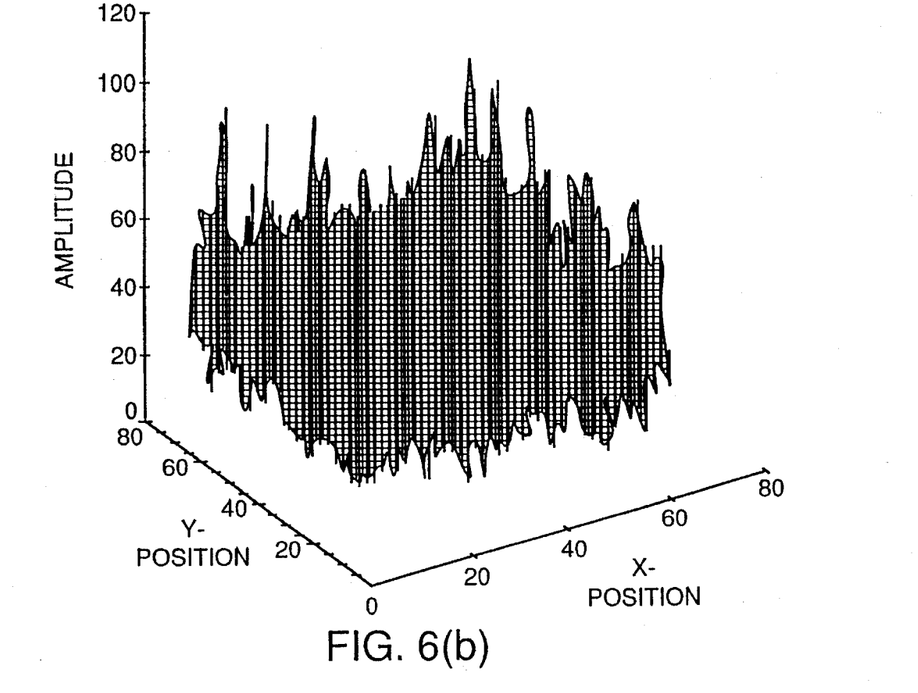
Figure 6C:
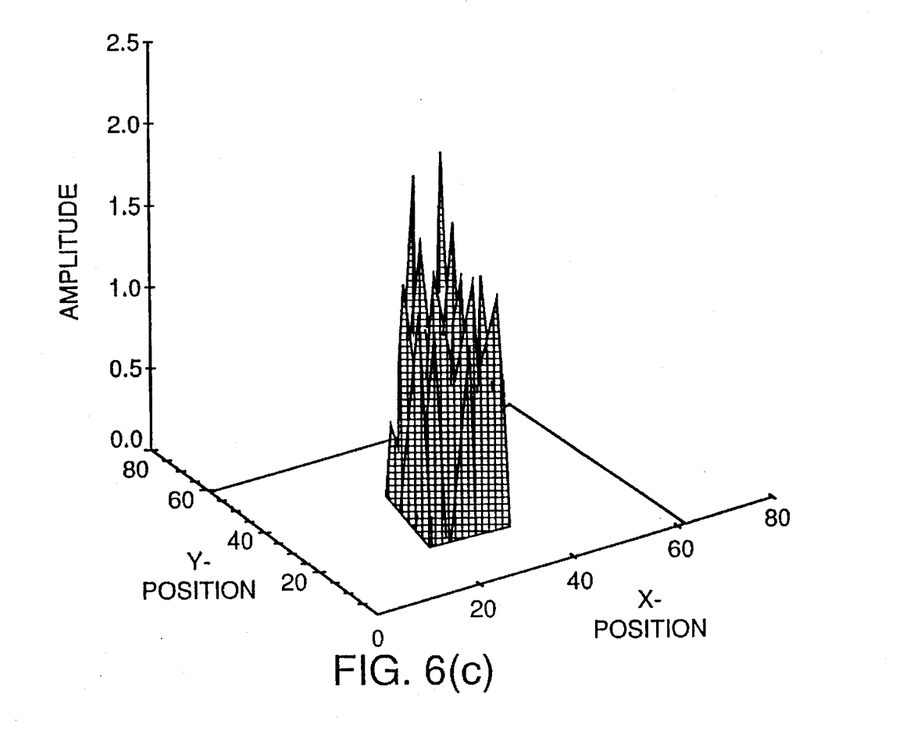
Figure 6D:
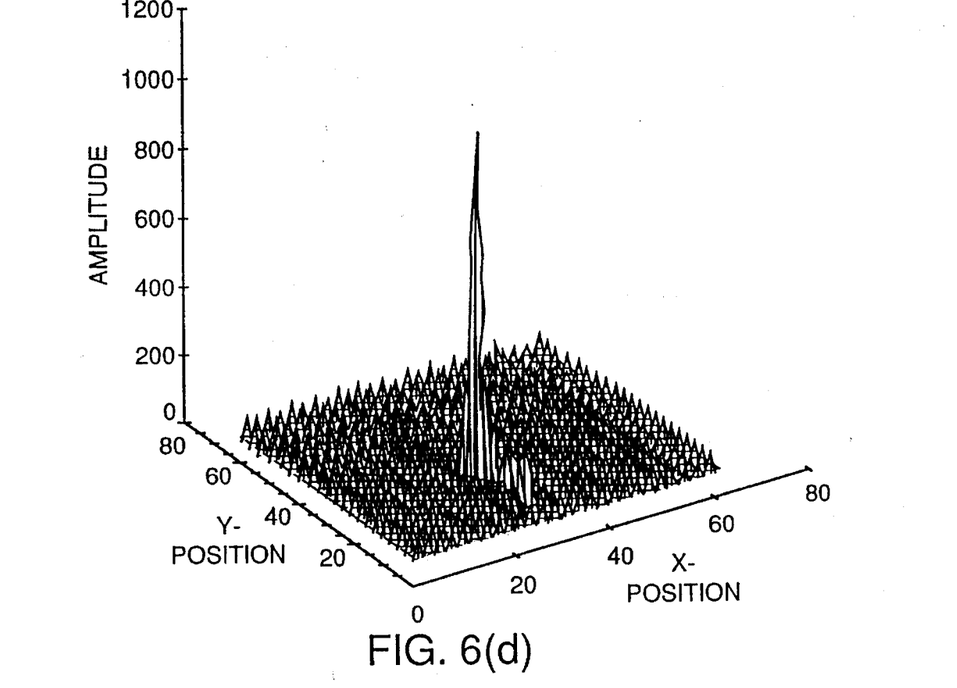
Figure 6E:
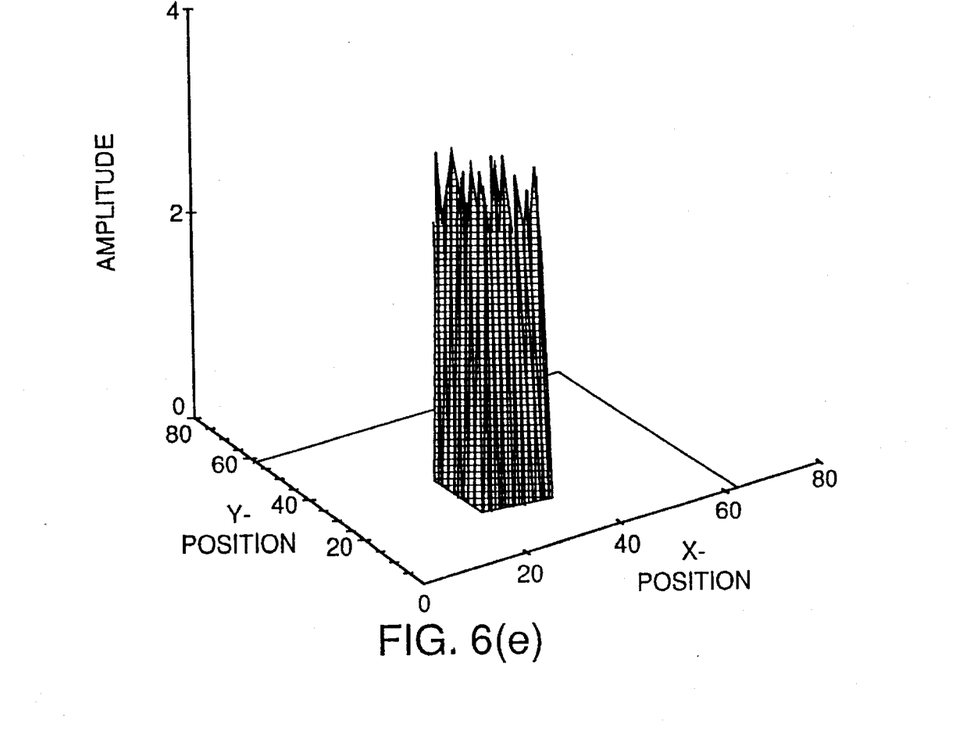
Figure 6F:
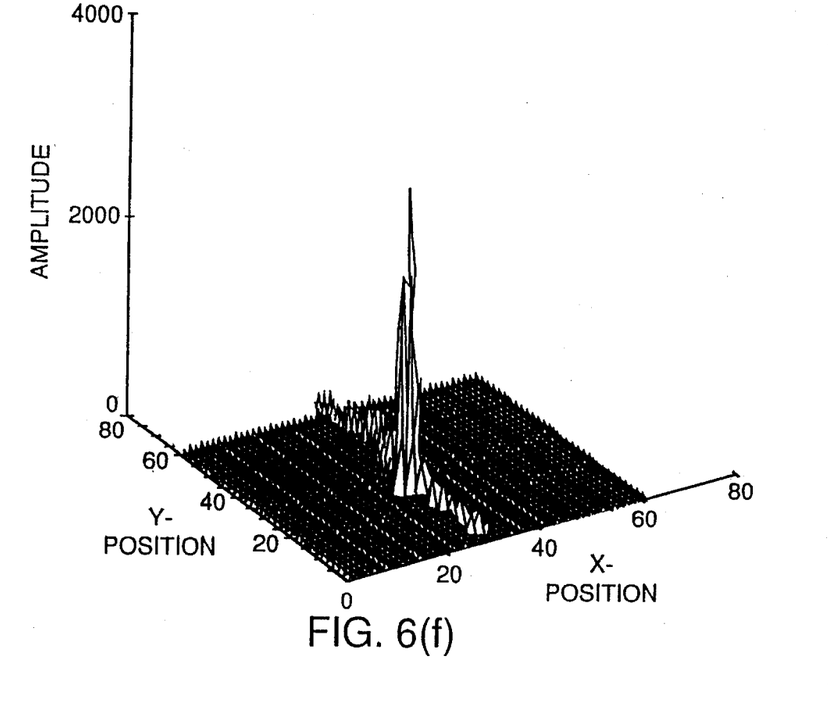

This device is shown in FIG. 4. Here the output of multimode fiber FM produced a noisy output wavefront indicated by DPF which is directed into crystal C1 by lens LM. The output of the single mode fiber FS is directed by lens LS through filter VF1 into crystal C1 to overlap the multimode beam within the crystal. Instead of beam splitting a second reference signal from the single mode fiber output for the reference in section B, it is probably sufficient to substitute a low-pass spatial filter mask for crystal C2 and eliminate the reference beam for section B. Lens L2 provides the Fourier transform of the beam exiting section A, and only the planar wavefront portion will pass through the pinhole and be collimnated by lens L3. This device will remove the noise in one of the orthogonal polarizations as determined by the crystallographic orientation of C1 and polarization transmitted by VF1 (normally along the c-axis indicated by the c-hat arrow. If DPF is the output of a multimode laser, the polarization is usually linear being fixed by some element within the laser cavity and the reference beam passing through LS would be a weak spatially filtered beam from the same laser. Unless a single mode polarization preserving fiber is used, beams from fibers are normally depolarized, and one could take one of the following approaches: 1) use a polarizing beamsplitter and implement two of the devices of FIG. 4 in parallel, one for each polarization (possibly combining the beams again with a polarizing beam splitter), or 2) use two serial steps of the FIG. 4 section A device, one for each polarization, and then spatially filter in section B.

In practice, high power beams normally produce laser induced damage when focussed, and a more robust cleanup is provided by using phase encoding in VF1 which distributes the intensity in section B over many bright points, lines or arcs as determined by the complex filter VF1 (in this case VF1 might be produced holographically). In this case, the device in section three can be removed and replaced by a precisely aligned phase compensator which is simply the point inverted version of VF1.

For example, one might use the hologram of a cylindrical lens array imaged onto section A for the phase of VF1 with the amplitude transmittance set by a spatially variable grey level filter. In this case, the Fourier transform filter of section B may be replaced by an array of slits. Finally the device of section C is replaced by second cylindrical lens array.

An alternate implementation of cleanup of a multimode fiber output would replace the single mode fiber reference with a device which selects one noise peak from the output beam to separate a weak intensity clean beam from the noise. For example, a pinhole in a mirror will reflect and separate all but one noise peak which is transmitted through the pinhole. The pinhole spatially filters the transmitted beam to provide a weak clean reference beam. One such device will cleanup one of the two orthogonal polarizations. It will probably be necessary to such devices in series to clean up each of the two polarizations. Standard optical engineering may be used to minimize the components for this serial device.

Another application is provided by using Section A (and possibly section B and C) to compress the dynamic range of a signal to enable it to match the dynamic range of an inexpensive analog storage system. On readout, one switches sections A and C to expand the signal stored in the dynamic range constrained by the storage material (possibly using only the expansion section) to restore the original dynamic range of the signal. This restores the original dynamic range of the signal for readout.

These are examples of the various parallel two-dimensional optical implementations of the electronic companson signal processing. Other examples of optical parallel implementations of electronic approaches may be similarly implemented using this device or its simple modifications.

In order to define our terminology and by way of introduction, we present solutions of the coupled wave equations in a form relevant for communication theory. We then illustrate two interesting phase elimination limits: hard limiting and quadratic processing.

The general interaction between two beams has been presented in several references (11,12,13). In the case of diffusive transport of charge carriers in the medium, the coupling constant is real, and it is easily shown that $$A_1(x,z) = A_1(x,0) \sqrt{\frac{1 + m(x)^{-1}}{1 + m(x)^{-1}\exp(\Gamma z)}} \; \exp\left(-\frac{\alpha}{2} z\right) \quad (1)$$

$$A_2(x,z) = A_2(x,0) \sqrt{\frac{1 + m(x)}{1 + m(x)\exp(-\Gamma z)}} \; \exp\left(-\frac{\alpha}{2} z\right) \quad (2)$$

where x is the transverse beam coordinate (henceforth implicit), $\Gamma(=2\gamma)$ is the intensity coupling constant, and $m(x)$ is the input beam intensity ratio given by $$m = \left| \frac{A_1(0)}{A_2(0)} \right|^2 \qquad (3)$$

When we pump a clean beam $A_2$ by an image bearing signal beam $A_1 s(x)$, the variable m may be replaced by $ms^2$ in Eq. 3 and 4. Here $s(x)$ corresponds to a real signal having values $0 \leq s \leq 1$, and we may rewrite Eq. 2 as:

$$A_2(z) = A_2(0) f(s) \exp\left( -\frac{\alpha}{2} z \right) \qquad (4)$$

where f(s), the photorefractive two-beam coupling operator, is defined as $$f(s) = \sqrt{\frac{1 + ms^2}{1 + mbs^2}} \qquad (5)$$

where $b = \exp(-\Gamma l)$ and l is the crystal thickness.

The transfer function of this operator is similar to the transfer function of a limiting quadratic processor (6) because it has two interesting limits: [1] the phase eliminating hard clipping limit and [2] the square law detector limit.

The transfer function of this operator is similar to the transfer function of a limiting quadratic processor (6) because it has two interesting limits: [1] the phase eliminating hard clipping limit and [2] the square law detector limit.

The hard clipping occurs when we pump a clean beam by a very strong signal beam (m>>1). In that case, the output becomes independent of the intensity of the signal beam. (i.e. f(s) approaches $b^{-\frac{1}{2}} = \exp(\gamma z)$ in Eq. 5). In the other case, the operator reaches the quadratic (or square law detector) limit when the intensity of the signal beam is much lower than that of the clean beam (m<<1) and the coupling coefficient is small.

By Taylor expansion of Eq. 5 around s=0 for very small values of m and $\gamma$, f(s) can be approximated as $$f(s) = 1 + \left[ \frac{1}{2} mb + \frac{1}{2} m \right] s^2 = 1 + [m\gamma l s^2] \qquad (6)$$

Cubic photorefractive materials such as GaAs can be oriented so that the light corresponding to the first term in Eq. 6 is polarized orthogonally to the light corresponding to the quadratic term (14,15,16), enabling the quadratic term to be separated by a polarizing analyzer. The remaining quadratic term represents the response of a square law detector. We would like to reiterate that the quadratic processor is used in detecting signals in non-Gaussian noise (5,17) and that the limiting quadratic processor is the optimal receiver for Gaussian signal in non-Gaussian noise (6).

In optical beam cleanup one desires to transfer as much energy as possible from an arbitrarily noisy (i.e., "dirty") beam into a clean beam. For optimal operation, it is essential to minimize transfer of both the phase, and the amplitude (i.e. zero-crossing and gray level) features from the dirty beam.

In two-beam coupling with a real coupling constant, phase transfer is always avoided because the signal beam transfer function depends on the squared modulus of the input beam. This is the basis of beam cleanup as investigated by Yeh. However, the other two amplitude transfer sources of contamination have not been investigated to the best of our knowledge.

A full investigation of the effectiveness of two beam coupling beam cleanup would include discussions of the effects of geometric overlap and diffractive propagation of the beams crossing at a nonzero angle with respect to each other. Nevertheless, we can gain some insight by examining the effects of the spatially varying transfer function in the quasi plane wave two-beam coupling model.

Looking at Eq. 5, we can see that optical rectification and full beam cleanup occurs as long as $A_1(x,y) >> A_2$, regardless of the magnitude of the material's coupling constant; however, we should note that there will be no clean-up at any point where $A_1(x)$ approaches zero. To illustrate this point, consider a case where $A_1(x) = A_0 \cos(x)$, with $A_0$ constant. In FIG. 1A, we show the results of rectification according to Eq. 5 with $g = \Gamma l = 5$. In the figure, the dashed and the solid curves correspond to the value of m equal to $10^3$ and $10^4$ respectively. As shown from the solid curve, considerable rectification already occurs with an amplitude input ratio of $10^4$. To eliminate the unrectified components where $A_1 = 0$, we can apply low pass spatial filtering.

Figure 3:
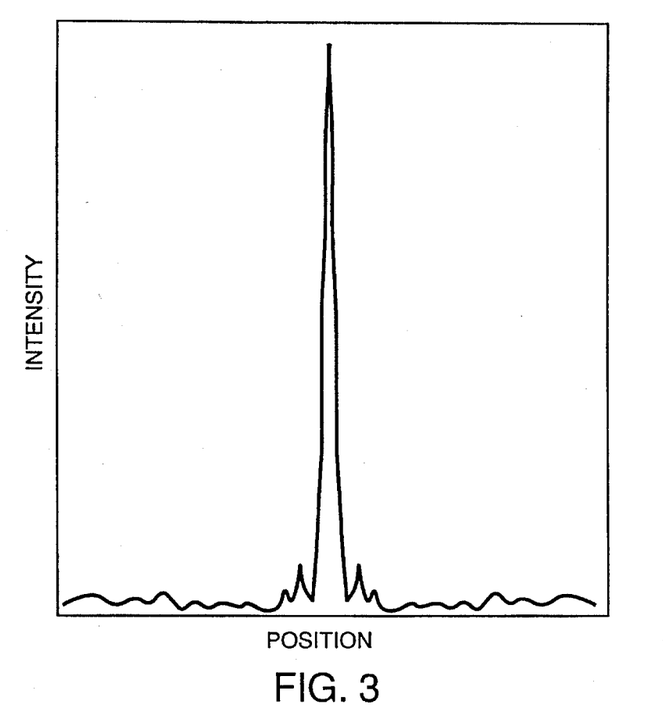
FIG. 3 illustrates the results of a beam clean-up experiment displayed in the Fourier transform plane, where the Gaussian input beam was corrupted by random multiplicative speckle noise.

We examined the performance of photorefractive two beam coupling for beam cleanup through computer simulation and by experiment using $BaTiO_3$. In our simulation, we use a random Gaussian noise to pump a clean reference beam. FIG. 3 shows the cross-section of the Fourier transformed output in which there is a large DC peak, surrounded by noise which can be removed with a low pass spatial filter. A good cleanup experiment should be able to transfer as much energy as possible from the dirty pump beam into the DC peak of the Fourier transform of the output beam; thus reducing the integrated surrounding noise energy. Therefore it is clear from the computer simulation that a complete beam clean-up never occurs using previously described approaches(2).

We propose a modified scheme of beam cleanup which requires an additional stage of nonlinear or spatial filtering in the Fourier plane. A schematic diagram of the simplest implementation is shown in FIG. 4. For low power output beams, a low-pass spatial filter is sufficient to remove the large fraction of background noise remaining (possibly equal to the energy in the clean portion). The optimum condition of beam clean-up efficiency when a thin photorefractive crystal is used in section A results from the tradeoff between grating efficiency and signal compression. In two-beam coupling, there is a maximum amount of energy that can be coupled into the amplified beam. Our analysis shows that the conditions for the maximum diffraction efficiency do not provide the best signal to noise in the cleaned beam. Compression occurs in our suggested beam ratio values (as described below) which greatly improves the signal to noise in beam cleanup relative to a simple holographic or a quadratic coupling limit in two-beam coupling.

When thick crystals are used in section A, beam propagation methods must be used to model the efficiency precisely. It is, however, clear that simple geometric blurring from the angle of the reference and noisy signal will smear the noise structure in the direction along the plane defined by the lines of the reference beam and input noisy signal beam (usually parallel to the optical table or horizontal). The remaining vertical noise may be removed by using a cylindrical lens to focus the output through a one-dimensional low-pass horizontal slit for the geometry described here. Beams focussed with a standard circular lens produce a very high intensity, sometimes melting a pinhole spatial filter or heating a crystal. The use of a cylindrical lens in this design enables a substantially higher powered beam to be generated in our spatial mask or nonlinear deamplification (section B) filtered design for two-beam coupling beam cleanup. For example, this method will provide beam cleanup of the output from a multimode fiber by using a magnified version of output face (or another exit beam cone section) to pump either a single mode fiber output or one of the bright peaks of light in the multimode output pattern selected by, for example, a pinhole in a mirror. This separates a the weak but clean reference beam (it has been filtered by a pinhole) from the reflected noisy beam.

For a multimode fiber output cleanup, it would probably be necessary to provide the following: 1) a second similar section A stage in series with the first, arranged to clean up the orthogonal polarization (polarization control of the reference beam may be required, as well as including polarization control in VF1 and VF2); and 2) if the pattern is time dependent, a position adaptive pinhole to select the peak producing the weak clean reference beam (possibly connecting the pinhole to a grinlens coupled single mode fiber).

In the past, the conversion of multiplicative noise to additive noise has been performed in digital and optical signal processing through homomorphic filtering. Homomorphic filtering consists of three stages: [1] logarithmic filtering which is used to convert multiplicative noise to additive noise; [2] low pass or Wiener filtering which is used to reduce the additive noise; and [3] exponential filtering which is used to recover the gray levels of the image.

In optics, logarithmic operation is achieved by recording the noisy image on film having a logarithmic response. Recording an image on film is always accompanied with quadratic processing similar to that in the CCD detection used in digital signal processing. We will show that the quadratic processing is the origin of converting multiplicative noise to additive signal dependent noise or scaler multiplicative noise. The logarithmic operation in the homomorphic filter is responsible for converting scaler multiplicative noise to additive noise. In practice, the logarithmic filter is a form of a compressing nonlinearity while the exponential filter is a form of an expanding nonlinearity. Here, we propose to generalize the definition of homomorphic filtering by including the principle of compansion (compression and expansion).

In companding techniques, the transmitter gain decreases with the signal strength, and the receiver gain increases with the signal strength. The range of the transmitted signal power is compressed and the range of the received power is correspondingly expanded. Companding techniques have been used extensively in serial electronic for speech transmission, and have proved to be a successful technique for improving signal to noise ratio.

Another optical technique for reducing multiplicative noise relies on time averaging holography (21), but the drawback of this technique is that it does not reduce noise in real time.

We will show that the quadratic processing associated with photorefractive two-beam coupling can be used for converting multiplicative noise to additive signal dependent noise while the limiting behavior (ie. compression) can be used for improving the signal to noise ratio.

The experimental setup used to demonstrate multiplicative to additive noise conversion is shown in FIG. 4. It used an argon ion laser operating at 514.5 nm with an intracavity etalon providing operation on a single longitudinal mode. The beam is spatially filtered and split into two beams by a beam splitter. One of these beams is used as a clean reference beam, and the other passes through a weakly diffusing plate to produce multiplicative complex noise on the signal. Our object consists of three bars of an Air Force resolution chart. A lens L of focal length of 20 cm images the resolution chart pattern into a photorefractive crystal of $BaTiO_3$ of dimensions 1 cm×1 cm×2 cm. Our experimental results are in agreement with the simulations described in the following section.

Signal compression has always been considered a drawback in two-beam coupling experiments because the contrast of the images decreases. However, in certain applications, such as noise reduction, the compression can be used to an advantage in increasing the signal to noise ratio (SNR). To illustrate this, we consider a two-dimensional signal pattern of three noisy bars in a computer simulation of multiplicative to additive noise conversion.

FIG. 6 shows the simulation results for the signal with complex multiplicative noise of zero mean. FIG. 6A shows the three noisy bars and 6B is a 3-D plot of their Fourier transform. It is clear from the figure that there are no recognizably distinct Fourier orders. This is in agreement with our experimental results. However, when a simple quadratic operator was applied to the noisy input, the DC and some low order components of the clean signal spectrum appear surrounded by noise, as shown in FIG. 6C. The ratio of the central peak to the average value of the surrounding noise peak was approximately equal to 30. An improvement of this result is achieved by applying the limiting quadratic processor operator of two-beam coupling to the noisy image (FIG. 6E). In our computer simulations we use g=3 and a beam intensity ratio of 300. We observe in FIG. 6E that the noise dips become shallower than those appearing in the square of the original input information shown in FIG. 6C. Using the limiting quadratic operator in the image plane led to a 5 times increase in SNR over that achieved by using a pure quadratic operator. FIG. 6F clearly shows that more of the Fourier orders are now distinguishable.

For binary images, increasing the intensity ratio m of the signal to the clean beam usually enhances the Fourier orders of the object and increases the ratio of peaks of the Fourier order to the peaks of noise. However, this improvement reaches a point of saturation when further increases in m barely improve the SNR. This saturation may be attributed to the inability to remove the zeros introduced by noise into the image no matter how large m is made.

We showed in the previous section that conversion of multiplicative noise to additive noise can be achieved by eliminating the phase information through energy transfer in photorefractive two-beam coupling. A compressing nonlinearity has two additional effects. It improves the SNR in the Fourier plane and it decreases the image contrast.

The first step in the technique consists of (1) conversion of multiplicative noise into additive noise and (2) signal compression for improving the signal-to-noise ratio in the Fourier plane. We demonstrated experimentally and through computer simulation that these two operations can be achieved simultaneously through photorefractive two-beam coupling. The third step is to remove the noise in the Fourier plane by using a phase-preserving thresholding mechanism, as can be done through deamplification with two-beam coupling. Usually, the remaining image has its noise reduced, but with low contrast. Therefore, a technique for contrast recovery should be used in the final stage. The last stage can also be achieved by using two-beam coupling or by a photorefractive quadratic processor. In the latter technique, the contrast recovery can be done in such a way as not to reintroduce noise.

Figure 7:
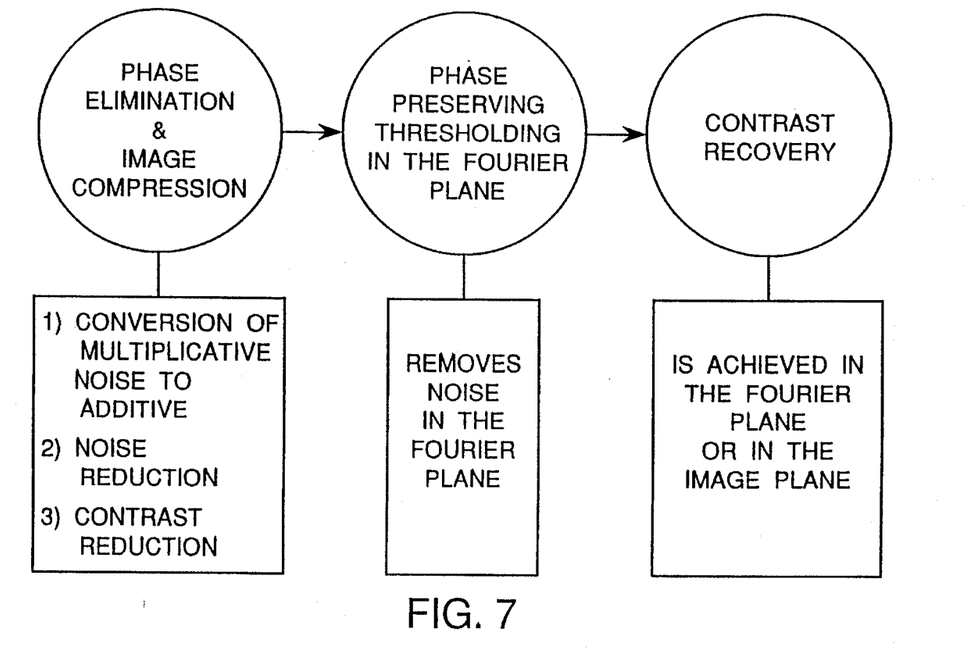
FIG. 7 shows a block diagram outlining the steps in the general technique for reducing multiplicative noise.

This companding noise reduction technique illustrated in the block diagram of FIG. 7 can be generalized for any nonlinear medium, or any computational method. These generalized steps are: (1) conversion of multiplicative noise to additive noise; (2) signal compression in the image plane; (3) thresholding in the Fourier plane; and (4) contrast recovery through expansion.

Using the limiting quadratic processor nonlinearity, we have restored the spatial coherence of the signal and we have converted the complex multiplicative noise to additive signal dependent noise. The nonlinear transform method is an established technique that we can use to evaluate our nonlinear device for processing additive noise. This method relies on the expansion of the nonlinear transfer function of the device into a summation of vth order nonlinear transfer functions, ie. a Taylor expansion, and evaluating the performance of every vth order nonlinearity in the additive noise reduction process.

For the region where the input SNR=(S/N)i <<1, the output SNR=(S/N)$_o$, becomes $$\left(\frac{S}{N}\right)_o \alpha \, F(v) \left(\frac{S}{N}\right)_i^2 \qquad (7)$$

where $$F(v) = \frac{1}{\Gamma_m^2\left(\frac{v}{2}\right) \sum_{k=2}^{\infty} \frac{1}{\left(\frac{k}{2}\right)! \Gamma_m^2\left(1-\frac{k-v}{2}\right)}} \qquad (8)$$

where $\Gamma_m$ represents the mathematical gamma function. FIG. 11 shows F(v) as a function of the order of the nonlinearity. The stronger the operator is at expanding (v>1 and increasing), the lower the SNR falls. However, the stronger the operator is at compressing (v<1 and decreasing), the more the output SNR improves. This same trend occurs for (S/N)$_i$>>1, where the output SNR varies as, $$\left(\frac{S}{N}\right)_o \alpha \frac{2}{v^2} \left(\frac{S}{N}\right)_i \qquad (9)$$

Here the improvement in output SNR is substantial for compression, v<1.

The nonlinear transfer method for evaluating serial electronic nonlinear devices can be used to evaluate the performance of any spatial nonlinear optical device. At this stage, we would like to make a general statement and avoid lengthy calculations. We expect that in the regions where the operator is an expander, the two beam coupling limiting quadratic processor should decrease the SNR$_o$; and that in the regions where the operator is a compressor, the two beam coupling operator should increase the SNR$_o$. The two beam coupling operator for small m behaves as a square law receiver, ie. v=2, reducing the SNR. For large m, the operator behaves as a hard clipper, ie. v~0, improving the SNR.

We introduced the concept and use of limiting optical quadratic processing for multiplicative noise reduction using photorefractive two beam coupling. We discussed the best operational point and the optimal conditions for both SNR improvement in images and for beam cleanup. In addition, we showed theoretically and demonstrated experimentally that quadratic processing is responsible for converting multiplicative complex noise to additive signal dependent noise. However, the limiting behavior (ie. compression) is responsible for improving the signal to noise ratio. Finally, we presented a general companding technique for reducing multiplicative noise in images. This nonlinear technique is a generalization of homomorphic filtering. To our knowledge, this is the first time that the compansion technique used in serial communication theory has been implemented in optical signal processing in the spatial domain.

Other variations on the foregoing will become apparent to the skilled worker in the art and thus the invention is to be limited only by the scope of the terms of the following claims and art recognized equivalents thereof. For example, a spatial light modulator operating in a nonlinear mode may be used in place of some or all of the photorefractive crystals. Also a smart pixel-spatial light modulator may be used similarly possibly with multiple detectors per pixel and possibly with multiple reference beams to produce more complicated forms or combinations of the basic nonlinearity. Also a combination of a detector, an electronic analog and/or digital processor and a spatial light modulator may be used similarly for each individual section as well as for two or more sections in combination. Also included is a completely digital implementation of this approach to image processing noise removal.

What is claimed is:

1. A method of reducing multiplicative noise in an optical image comprising the steps of:
   (a) directing a noisy signal beam having an optical image thereon corrupted by complex multiplicative noise at a first nonlinear optical device;
   (b) directing a phase restoring reference beam, coherent with respect to the noisy signal beam, into said first nonlinear optical device for generating nonlinear coupling therein which produces a phase restored output beam having an intensity which is less than the intensity of the noisy signal beam;
   (c) Fourier transforming said phase restored output beam from said first nonlinear optical device and directing the resulting transformed phase restored output beam into a second nonlinear optical device; and
   (d) directing a coherent noise reducing reference beam into said second nonlinear optical device for producing two beam coupling therein and a noise reduced output signal therefrom.

2. The method of claim 1 further including the step of directing a contrast restoring coherent reference beam into a third nonlinear optical device along with a Fourier transform of said noise reduced output signal for producing two beam coupling therein and a resulting contrast restored output beam.

3. The method of claim 2 including the step of causing the intensity of the noisy signal beam to be 100–1000 times greater than the intensity of the phase restoring reference beam.

4. The method of claim 3 wherein the intensity of the contrast restoring reference beam is two to ten times greater than the intensity of said noise reduced output signal bearing said optical image.

5. The method of claim 2 wherein the intensity of the contrast restoring reference beam is two to ten times greater than the intensity of the noise reduced output signal bearing said optical image.

6. Method of claim 2 wherein at least some of said nonlinear optical devices include photorefractive crystals.

7. The method of claim 1 including the step of causing the intensity of the noisy signal beam to be 100–1000 times greater than the intensity of the phase restoring reference beam.

8. Method of claim 7 wherein at least some of said nonlinear optical devices include photorefractive crystals.

9. Method of claim 1 wherein at least some of said nonlinear optical devices include photorefractive crystals.

10. A method of reducing multiplicative noise in an optical image comprising the steps of:
    (a) inserting a noisy signal beam having an optical image thereon corrupted by complex multiplicative noise into a first nonlinear optical device;
    (b) directing a phase restoring non-image bearing reference beam, coherent with respect to the noisy signal beam, into said first nonlinear optical device for generating nonlinear coupling therein which produces a phase restored output beam; and
    (c) causing the intensity of the noisy signal beam to be 100–1000 times greater than the intensity of the phase restoring reference beam.

\* \* \* \* \*